(12) United States Patent
Schmidt et al.

(10) Patent No.: US 6,743,482 B2
(45) Date of Patent: Jun. 1, 2004

(54) IMPREGNATED CONVOLUTED BOOT

(75) Inventors: Thomas Schmidt, Siegburg (DE); Joachim Wette, Hennef (DE); Thomas Schafferus, Rheinberg (DE); Herbert Konegen, Rösrath (DE); Hans Schreiber, Völklingen (DE)

(73) Assignee: GKN Automotive AG (DE)

( * ) Notice: Subject to any disclaimer, the term of this patent is extended or adjusted under 35 U.S.C. 154(b) by 0 days.

(21) Appl. No.: 10/396,920

(22) Filed: Mar. 24, 2003

(65) Prior Publication Data

US 2003/0143355 A1 Jul. 31, 2003

Related U.S. Application Data

(63) Continuation of application No. 09/554,548, filed on Jul. 17, 2000, now Pat. No. 6,569,021.

(30) Foreign Application Priority Data

Nov. 14, 1997 (DE) .......................................... 197 50 376

(51) Int. Cl.$^7$ ................................................. B05D 1/00
(52) U.S. Cl. ...................................................... 427/384
(58) Field of Search ......................................... 427/384

(56) References Cited

U.S. PATENT DOCUMENTS

| | | | | | |
|---|---|---|---|---|---|
| 4,265,663 | A | * | 5/1981 | Gilicinski et al. | ............. 106/10 |
| 4,573,693 | A | * | 3/1986 | Nakata et al. | ............... 277/636 |
| 4,830,767 | A | * | 5/1989 | Waynick | ...................... 508/163 |
| 4,967,609 | A | * | 11/1990 | Takagi et al. | ................... 74/18 |
| 5,223,161 | A | * | 6/1993 | Waynick | ...................... 508/177 |

FOREIGN PATENT DOCUMENTS

JP         6 280891        10/1994

* cited by examiner

*Primary Examiner*—Erma Cameron

(57) ABSTRACT

The invention relates to an impregnating agent for a convoluted boot consisting of a thermplastic or elastomer material and used for covering the chamber of a joint, especially a rotating joint subjected to large articulation angles, which joint chamber is filled with a lubricant, said convoluted boot comprising a plurality of folds and two end collars, with the surfaces of the convoluted boot wall contacting one another when the joint is subjected to large articulation angles. It is the object of the invention to reduce the wear and eliminate squeaking symptoms of convoluted boots treated with the inventive impregnating agent. In accordance with the invention, the objective is achieved in that the impregnating agent contains a carrier fluid, an oil dissolved in the carrier fluid and having a molecular weight of >200, and a wetting agent which is soluble in oil and which reduces the surface tension of the oil.

19 Claims, No Drawings

IMPREGNATED CONVOLUTED BOOT

CROSS-REFERENCE TO RELATED APPLICATIONS

This is a continuation of U.S. patent application Ser. No. 09/554,548 filed on Jul. 17, 2000 now U.S. Pat. No. 6,569,021.

The invention relates to an impregnating agent for convoluted boots consisting of a thermoplastic or elastomer material and to such convoluted boots which are impregnated with such an impregnating agent. Such convoluted boots are frequently used for covering the chamber of a joint, which joint chamber is filled with a lubricating agent; they prevent lubricating agents from leaving the joint chamber, while preventing dirt from entering the joint chamber. Such convoluted boots are often used for rotating joints incorporated into vehicle drivelines. The two end collars of the convoluted boot enclose a shaft on the one hand and a joint component on the other hand, to which shaft and joint component respectively they are clamped by tensioning strips.

At large joint articulation angles, the folds of the convoluted boots which are also articulated are deformed to such an extent that their outer surfaces contact one another. If this causes relative movements between the surfaces, the resulting friction has two undesirable effects: thus it cannot be avoided that, if dirt enters, the abrasive effect at the outer surfaces of the folds, in time, is responsible for the removal of material, as a result of which the service life of the convoluted boot is reduced. In addition, in the case of convoluted boots with a running time in the vehicle of less than 10,000 km, a squeaking noise is identifiable if water is added, which is regarded as adversely affecting comfort.

From DE 43 01 062 C1 there is known a convoluted boot which is provided with a surface coating consisting of poly alpha olefins in order to reduce the friction between the surfaces of the boot wall which contact one another at large articulation angles. When dirt particles are present as well, such a surface coating is removed within a short time, so that if a joint with a high load spectrum is subjected to large articulation angles, an improvement is achieved for only a certain period in service life of the convoluted boot.

U.S. Pat. No. 4,830,767 proposes a lubricating grease for driving joints which are covered by a convoluted boot. The purpose of said grease is to protect the elastomer of said convoluted boots against breaking and becoming brittle during long periods of wintry operation. Furthermore, it is mentioned that said grease constitutes a good lubricating agent between metal parts on the one hand and elastomer plastics on the other hand. It is proposed that poly alpha olefins are used as a base for such a grease. However, to achieve the desired effects, it is necessary to add a combination of carbonate and phosphate additives.

U.S. Pat. No. 5,223,161 describes a grease for the same type of application, which grease is based on poly alpha olefins, with a package of additives consisting of sulphate and an aliphatic monocarboxylate.

From U.S. Pat. No. 4,967,609 there is known a convoluted boot consisting of a rubber material, which boot comprises a closed coating or individual annular elements which are permanently applied to the surface of the folds, with the coating or the individual annular elements consisting of a rubber material constituting the carrier substance and of an anti-degradation agent which are to be diffused into the surface of the convoluted boot.

U.S. Pat. No. 4,573,693 describes a convoluted boot for covering constant velocity universal joints, which boot comprises a coating layer consisting of polyamide resin which is glued to the base member by means of a primer coating. The purpose is to reduce wear by means of a coating consisting of a different material, which coating is glued on to the base member.

U.S. Pat. No. 4,265,663 proposes to apply a wax compound consisting of a liquid poly alpha olefin and a liquid silicon to rubber and elastomer hoses and connectors to protect same and thus render same durable. The liquid silicon is used in the form of an aqueous emulsion.

From the unpublished DE 196 19 368.0 there is known a convoluted boot impregnated with an agent consisting of hydrocarbons with a molecular weight of >200.

It is the object of the invention to provide an impregnating agent for convoluted boots and convoluted boots impregnated with an improved type of impregnating agent by means of which the wear of mutually contacting surfaces of the folds of convoluted boots can be permanently reduced, with the squeaking phenomenon being eliminated.

In accordance with the invention, the objective is achieved with the help of an impreganting agent which contains a carrier fluid, an oil dissolved in the carrier fluid and having a molecular weight of >200, and a wetting agent which is soluble in oil and which reduces the surface tension, and with the help of a convoluted boot provided with an impregnation and optionally with a film coating from an impregnating agent, which consist of an oil comprising a molecular weight of >200 and of a wetting agent which is dissolved in oil and reduces the surface tension of the oil. By impregnating the convoluted boot with an inventive impregnating agent it is possible to achieve a permanent reservoir of lubricating agent for the outer surface for the entire service life of the convoluted boot. The impregnating agent ensures permanently advantageous friction conditions on the surface. When the folds of a convoluted boot impregnated in accordance with the invention are subjected to high articulation angles and contact one another, the amount of wear is reduced to a minimum and the squeaking symptoms are suppressed. The inventive impreganting agent can be applied to convoluted boots consisting of a thermoplastic material and to those made of an elastomer material.

Because the impregnating agent contains a percentage of wetting agent, the convoluted boot wall absorbs a much larger amount of oil when the convoluted boot is impregnated under given boundary conditions. Furthermore, the surface of the convoluted boot is provided with a uniformly distributed oily impregnating agent film which does not penetrate the material, with the impregnating agent contained in the convoluted boot wall having a supporting effect on the impregnating agent film.

Preferred examples of wetting agents are fatty acid derivatives, sulphonates, amide waxes, oxide waxes (the tradename of which is Alox, Locksol), and nitrogen containing heterocyclic compounds such as imidazolenes.

Suitable oils are hydrocarbon oils, both of natural and synthetic hydrocarbons, and ester oils. The latter, in the form of an additive, is able to prevent the extraction of softener from the convoluted boot wall resulting from the impregnating process.

The hydrocarbon oils can be used in the form of poly alpha olefin oils or paraffinic mineral oils, either on their own or a combination thereof.

The carrier fluid is preferably used in the form of paraffins or isoparaffins. The carrier fluid should be volatile at its processing temperature and must not form part of the remaining impregnating agent applied to the convoluted boot.

A suitable viscosity of the impregnating agent applied to the convoluted boot ranges between 1.5 and 20 mm²/sec at the processing temperature of the impregating agent. Said viscosity allows the impregnating agent to enter the outer surface region, with the carrier fluid, subsequently, largely evaporating, whereupon the oil and the wetting agent dissolved therein remain in the material of the convoluted boot in order to form said lubricant reservoir. The thickness of the impregnated wall region should not be less than 0.2 mm, starting from the surface. As a rule, however, the entire thickness of the convoluted boot wall is impregnated, as the inventive impregnating agent penetrates quickly and deeply until the point of saturation has been reached.

In a preferred embodiment, the collars of the convoluted boot are kept free from impregnating agent because a lubricating effect would not be suitable for the tensioning strips positioned thereon.

The convoluted boots treated with, and impregnated by, the inventive impregnating agent are neither subject to abrasion which, due to subsequent leakages, could adversely affect the functioning of the joint, nor do they exhibit any squeaking symptoms when in operation.

It is particularly advantageous if said wetting agent has a corrosion protection effect on metals. When, in accordance with the invention, the impregnating agent is applied to convoluted boots which are mounted on finish-assembled driveshafts, the impregnating agent can also be applied to the metallic parts of the driveshafts which, at the same time, are effectively and permanently protected against corrosion, which protection consists of a coating and film of the wetting agent dissolved in the oil and acting as a corrosion protection agent.

It is advantageous that when applying the impregnating agent to the finish-assembled driveshaft, the collar regions of the convoluted boots holding the tensioning strips are already covered by the latter, so that the collar regions are not impregnated. In consequence, there is no penetration of oil which might prevent the tensioning strips from fitting firmly.

Reference is hereby expressly made to further preferred embodiments which result from the sub-claims and which were not especially described above.

What is claimed is:

1. A method of impregnating convoluted boots with an impregnating agent comprising applying an impregnating agent to a convoluted boot to be mounted on a driveshaft wherein the impregnating agent comprises an oil with a molecular weight of greater than 200 and a wetting agent which is dissolved in the oil and reduces the surface tension of the oil.

2. A method according to claim 1 comprising applying the impregnating agent to metallic parts associated with the driveshaft so as to provide corrosion protection of the metallic parts.

3. A method according to claim 2 wherein the impregnating agent is applied to the metallic parts of the driveshaft when the driveshaft is in a finish-assembled state.

4. A method according to claim 1 wherein the convoluted boot comprises a thermoplastic or elastomer material.

5. A method according to claim 1 wherein the wetting agent is selected from the group consisting of fatty acid derivatives, sulphonates, amide waxes, oxide waxes, and nitrogen-containing heterocyclic compounds including imidazolenes.

6. A method according to claim 1 wherein the oil is selected from the group consisting of hydrocarbon oils and ester oils either on their own or a combination thereof.

7. A method according to claim 6 wherein the hydrocarbon oil is selected from the group consisting of poly alpha olefin oils and paraffinic mineral oils, either on their own or a combination thereof.

8. A method according to claim 4 wherein the wetting agent is selected from the group consisting of fatty acid derivatives, sulphonates, amide waxes, oxide waxes, and nitrogen-containing heterocyclic compounds including imidazolenes.

9. A method according to claim 5 wherein the oil is selected from the group consisting of hydrocarbon oils and ester oils either on their own or a combination thereof.

10. A method according to claim 4 wherein the hydrocarbon oil is selected from the group consisting of poly alpha olefin oils and paraffinic mineral oils, either on their own or a combination thereof.

11. A method of lubricating convoluted boots in a driveline assembly comprising providing a finish-assembled driveshaft including at least one convoluted boot, and applying an impregnating agent to the convoluted boot, wherein the impregnating agent comprises a carrier fluid, an oil dissolved in the carrier fluid and having a molecular weight greater than 200 and a wetting agent dissolved in the oil and which reduces the surface tension of the oil.

12. A method according to claim 11 comprising applying the impregnating agent to metallic parts associated with the driveshaft so as to provide corrosion protection for the metallic parts.

13. A method according to claim 11 wherein the convoluted boot comprises a thermoplastic or elastomer material.

14. A method according to claim 11 wherein the wetting agent is selected from the group consisting of fatty acid derivatives, sulphonates, amide waxes, oxide waxes, and nitrogen-containing heterocyclic compounds including imidazolenes.

15. A method according to claim 11 wherein the oil is selected from the group consisting of hydrocarbon oils and ester oils either on their own or a combination thereof.

16. A method according to claim 15 wherein the hydrocarbon oil is selected from the group consisting of poly alpha olefin oils and paraffinic mineral oils, either on their own or a combination thereof.

17. A method according to claim 12 wherein the wetting agent is selected from the group consisting of fatty acid derivatives, sulphonates, amide waxes, oxide waxes, and nitrogen-containing heterocyclic compounds including imidazolenes.

18. A method according to claim 17 wherein the oil is selected from the group consisting of hydrocarbon oils and ester oils either on their own or a combination thereof.

19. A method according to claim 18 wherein the hydrocarbon oil is selected from the group consisting of poly alpha olefin oils and paraffinic mineral oils, either on their own or a combination thereof.

* * * * *